United States Patent Office 3,167,479
Patented Jan. 26, 1965

3,167,479
**METHOD OF MAKING ENRICHED RADIOISO-
TOPES BY CATION FIXATION**
Paul Y. Feng, Skokie, Ill., assignor to IIT Research Institute, Chicago, Ill., a not-for-profit corporation of Illinois
No Drawing. Filed Nov. 5, 1963, Ser. No. 321,435
9 Claims. (Cl. 176—16)

The present invention relates to a method of making enriched radioisotopes and more particularly is directed to a novel method of producing high specific activity isotopes in considerably less time than any known process of the prior art. Such method includes the steps of cation fixation as an important element thereof.

Until the advent of the present invention the most convenient means of obtaining a number of artificial radioactive elements has consisted of either the separation of the desired element from fission products or the activation of a stable nuclei of a suitable element by neutrons from nuclear reactors. The former process of necessity is limited to those isotopes occurring in sufficient yields in the fission product spectrum. The latter process has the disadvantage that the product nuclei are often isotopic with the parent material; as a result the specific activities of such isotopes are necessarily limited and oftentimes can only be enhanced by prolonged irradiation in a high flux nuclear reactor.

My invention is in part based upon what may be termed "cation fixation" and makes use in the preferred embodiment hereof, of the imperfect lattices of substituted aluminum silicates. Generally speaking, the present process involves the introduction of the ionic species desired into such a lattice structure, the subsequent "fixation" of such ions, removal of the not-fixed ions, neutron irradiation of the composite structure and finally the preferential extraction of those nuclei which have gained recoil energy through the neutron, gamma (hereinafter referred to as the n,γ) process, and thereby become removed from the "fixed" sites of the aluminum silicate lattice structures. The specific details of my invention to enable one skilled in the art to practice the same are set out below.

One of the more important aspects of my invention is directed to the production of cobalt[60]. In the conventional process of forming such material, cobalt[59] is placed in a nuclear reactor where the atoms gain an extra neutron. As is well known to those skilled in this field the cobalt must remain in the reactor for several years in order that cobalt[60] of high specific activity is obtained. In distinction to such prior art processes by the practice of the present invention, one is able to make such cobalt[60] in only several months rather than several years. I have thus been able to make and segregate useful quantities of cobalt[60] approximately twenty times faster than is possible with the conventional processes. Similar enhanced reaction and separation times are likewise made available for a number of other cation species including for example, barium, sodium, magnesium, aluminum, potassium, calcium and scandium.

Furthermore, by the practice of my invention it is possible to more quickly, conveniently and expeditiously produce nuclear reaction products which differ in atomic number from the atomic number of the orginal nuclei which is placed upon the cation fixation member. Generally speaking, by such process I can carry out not only (nuetron, gamma) reactions but other reactions such as (neutron, proton) and (neutron, alphaparticle) likewise. These aspects too of my invention will be considered in the detail required for the practice of my process.

Accordingly, a primary object of my invention is to provide a novel method of making cation radioisotopes which is considerably faster and more convenient than any known process of accomplishing a similar result.

Another important object of my invention is to provide a nuclear reaction process which includes as an important step thereof the fixing of nuclei of material to undergo such reaction on inorganic ion exchange materials, particularly clays, which are resistant to neutron flux.

A more specific object of my invention is to provide a new method of making radioactive cobalt, i.e., cobalt[60].

Another more specific object of my invention is to provide a new method of making radioactive barium, i.e., barium[139].

Other objects of my invention include the method of making antimony[125] from tin[124], cobalt[58] from nickel[58] and scandium[48] from vanadium[51] by various nuclear reactions, all of such reactions involving cation fixation.

These and other objects, features and advantages of my invention will become apparent to those skilled in this particular art from the following detailed disclosure thereof.

Before considering some of the specific examples of the present process, some brief introduction should first be had to the theoretical principles which underlie it. As is known, clay minerals, which are a family of naturally occurring aluminum silicates, contain both within and without their Al—O—Si lattice structure sites for additional cations. This is what is referred to at times as imperfect lattice structures and such has been made use of for years in employing these materials for their ion exchange capabilities. Under certain circumstances the cations which are applied to the ion exchange material readily exchange and are substituted with other cations; under other circumstances, I have found that such cations can be made non-exchangeable or at best, exchangeable with some considerable difficulty. It is under the latter circumstances that I have been able to fix the cation in the aluminum silicate clay which is of particular importance in the practice of my invention.

In the present specification and for reasons of ready availability in carrying out the experimental processes which led to my invention the cation fixation means used was aluminum silicate clays. It will be appreciated that other similar materials may be employed for this purpose without departing from the spirit or scope of my invention. Such clays were selected both because the cations being readied for neuclear reaction could be fixed thereon and because such materials would not undergo degradation or transformation when subjected to high density neutron flux. Organic ion exchange materials should not be used since they do not meet the second criterion, but certainly other inorganic exchangers may be substituted in lieu of those specifically named in the present specification.

For explanatory purposes I wish to next consider a schematic reaction sequence using for purposes of example, naturally occurring sodium clay and any cation, $M^+$. The exchangeable and fixed sodium ions are denoted by $Na^+(...)$ and $(Na^+...)$ respectively. Four reactions are of interest to the present process:

(I)  $Na(Na—Clay)+M^+ \rightarrow M(Na—Clay)+Na^+$

This is the basic exchange reaction by which exchangeable sodium ions are replaced by M ions. Such reaction is known to follow the law of mass action and thus $$[M(Na\text{-clay})] = \frac{[MNa(Na\text{-clay}][M^+]}{[Na^+]}$$

Accordingly, the replacement can be made substantially quantitative either by the use of excessive $M^+$ or the successive removal of the $Na^+$ in repeated treatments.

The second reaction of interest involves the fixation of the M+:

(II) 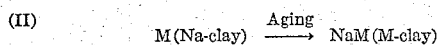
$$M(\text{Na-clay}) \xrightarrow{\text{Aging}} NaM(\text{M-clay})$$

This reaction likewise is an equilibrium process. If necessary the final sample can be made extremely high in fixed M+ simply by repeated aging and replacement of exchangeable Na+ with additional M+. In the case of montmorillonite clays I have found that more than 90% of the originally exchangeable cations can be fixed by heating the clay samples containing the desired cation at 700° C. for approximately 2 to 3 days.

The third reaction is the replacement of the exchangeable Na+ and M+ by $NH_4^+$ or H+:

(III) 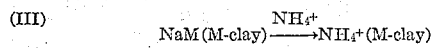
$$NaM(\text{M-clay}) \xrightarrow{NH_4^+} NH_4^+(\text{M-clay})$$

At this stage the M ions are either non-exchangeable or only exchangeable with great difficulty. Such actions are thus quite effectively held within the Al—O—Si lattice structure. Next one should consider the situation when the M+ nuclei are bombarded with neutrons and undergo an $(n,\gamma)$ process. The M nuclei would then receive, because of momentum conservation, energy which may be as much as several hundred electron volts and in any event considerably in excess of what is needed to overcome the lattice forces in the Al—O—Si structure. Thus we have the fourth reaction:

(IV) 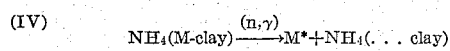
$$NH_4(\text{M-clay}) \xrightarrow{(n,\gamma)} M^* + NH_4(\ldots \text{clay})$$

In other words, those M nuclei which have been neutron activated may be projected out of the lattice structure and can therefore be readily separated from the bulk of the M ions which largely remain fixed. It is by the use of the foregoing theoretical consideration in conjunction with the hereinafter laboratory experimentation which gave rise to the present invention.

One aspect of my invention therefore is directed to a modified Szilard-Chalmers process for the preparation of radioisotopes.

My invention may be best understood by consideration of the following examples thereof:

EXAMPLE I

Preparation of cobalt[60]

In this series of experiments the aluminum silicate used was bentonite clay. Sodium-potassium-bentonite, U.S.P. grade was further purified and hydrated by repeated washing with water and recovering the clay by centrifugation. Initially such purified clay was then treated with 300 ml. of N HCl, collected on a Büchner funnel and then repeatedly leached with additional amounts of 2 N HCl until no potassium and sodium ions were detectable by the flame test. The combined HCl solutions containing the exchangeable potassium and sodium ions were analyzed by flame photometry to determine the cation exchange capacity of such clay to be 79.7 millequivalence per 100 grams of clay.

Another aliquot of the purified and hydrated sodium-potassium-bentonite was contacted with dilute aqueous solution of cobaltous chloride, collected on a Büchner funnel and repeatedly leached with $CoCl_2$ solution until the filtrate was free of sodium and potassium ions as detected by the flame test. This Co-clay was then dried and calcined at approximately 700–720° C. for periods ranging from 48 to 72 hours to effect the cation-fixation. Subsequently the clay was treated to remove as much as possible of the exchangeable cobalt contained therein. This step of the process was accomplished either by leaching with aqueous HCl solution or electrolytic extraction. In leaching a predetermined volume of 0.02 N HCl containing H+ in a millequivalent amount twice as large as that of the Co++ present in the specific bentonite sample was employed.

The samples were then irradiated either in the Armour Research Foundation boiling water reactor or in the CP-5 reactor of the Argonne National Laboratory. In all cases referenced cobalt standards were irradiated with the clay samples to provide information concerning any possible fluxations in the integrated neutron fluxes.

EXAMPLE II

Preparation of barium[139] from barium[138]

In this process the treatment steps are very similar to those which are set out in the example presented above. The same type of clay was used and was purified in the same manner as in the cobalt experiments. In this case the clay samples were treated with a dilute solution of $BaCl_2$, collected on a Büchner funnel and repeatedly leached with additional amounts of $BaCl_2$ solution until the filtrate contained no sodium or potassium ions detectable by flame tests. The amount of barium ions introduced based on that of sodium and potassium ions exchanged and as determined by flame photometry, was found to be 68.3 millequivalents per 100 grams of clay. Finally the barium bentonite obtained was heated for 48 hours at 700° C. in order to accelerate the barium ion fixation onto the clay. The extent of the $Ba^{++}$ ion fixation in these clay samples, based upon the amount of Ba ions, subsequently eluted with HCl amounted to 76.9% of the Ba ions originally introduced into the sample.

The fixed barium-bentonite clays were then irradiated for time periods ranging from 20 to 25 minutes in the ARF reactor where the neutron flux is $6 \times 10^{11}$ neutrons $cm.^{-2} sec.^{-1}$. In this case $BaCO_3$ was used as the reference standard.

Following irradiation the barium-bentonite samples were eluted twice with dilute solutions of either HCl or $CH_3COONH_4$ of predetermined concentrations. Following such treatments the supernatant liquids containing the released Ba ion were separated by centrifugation and decantation, concentrated by evaporization and then transferred into a glass counting vessel (containing approximately 0.2 gram of $NH_4NO_3$ which was added to aid subsequent handling) and finally evaporated to dryness.

The dried samples containing the barium[139] isotope were measured by means of an RCl 256 channel differential pulse height analyzer using a 3 x 3 inch NaI (Tl-activated) crystal.

Enrichment factors were determined for both the cobalt and barium samples.

As noted above, following irradiation the nuclei produced were extracted. This was accomplished either by ion exchange procedures (i.e., treating the irradiated clay samples with dilute solutions of HCl or $NH_4Cl$) or by electrodialysis (i.e., electrolyzing aqueous suspensions of the irradiated samples and collecting the radioactive nuclei in the cathodic chamber).

Following this determination of the enrichment factor was carried out by neutron-activation analysis for the presence of stable cobalt-59 or barium-138 nuclei in the extracted sample using the formula $$\text{Enrichment factor} = \frac{\text{Spec. activity of the extract}}{\text{Spec. activity if no enrichment}}$$

$$= \frac{C_1}{C_2 - C_1} \frac{nvt \text{ (re-exp.)}}{nvt \text{ (original)}}$$

for the Co-60 samples, or $\frac{C_1}{C_2} \frac{nvt \text{ (re-exp.)}}{nvt \text{ (original)}}$ for the Ba-138 samples. (In these formulae, $C_1$ and $C_2$ represent respectively the counting rate of a sample before and after re-exposure for neutron activation analysis, whereas $nvt$ (re-exp.) and $nvt$ (original) represent respectively the integrated fluxes used in the activation analysis and in the original hot-atom experiment. The difference between the formula for Co-60 and that for Ba-139 is due to the short half life of the latter nuclei).

The results of our experiments showed that the enrichment factors achieved are approximately 20 or higher in the case of Co-60, and approximately 3 in the case of Ba-139. The enrichment factors achieved are not sensitively affected by the intensity of the neutron flux over some three orders of magnitude, but are dependent to a considerable extent on the prior treatment of the clay samples as well as on the method of extraction.

The following tables present some of the results of the hereinabove experiments.

TABLE 1.—COUNTING DATA AND ENRICHMENT FACTORS SELECTED COBALT-60 CHEMICAL ELUTION EXPERIMENTS

| Sample Identification | Counting Data (c.p.m.), Original ($C_0$) | Re-exposure ($C_1$) | $\frac{(nvt) \text{ (re-exp.)}}{(nvt) \text{ (original)}}$ | Enrichment Factor |
|---|---|---|---|---|
| M-Feb 3-46-47 | $1.337 \times 10^4$ | $1.445 \times 10^4$ | 3.92 | 49 |
| M-Fin 3-58-59-a | $4.052 \times 10^3$ | $4.348 \times 10^3$ | 3.43 | 47 |
| M-Fin 3-58-59-b | $1.618 \times 10^3$ | $1.804 \times 10^3$ | 3.43 | 30 |
| M-Fin 3-60-61-a | $0.830 \times 10^3$ | $0.946 \times 10^3$ | 2.94 | 21 |
| M-Fin 3-60-a | $1.312 \times 10^3$ | $1.488 \times 10^3$ | 2.39 | 18 |
| M-Jan 3-2 | $9.39 \times 10^3$ | $9.92 \times 10^3$ | 1.0 | 18 |
| M-Jan 3-1 | $2.20 \times 10^4$ | $2.36 \times 10^4$ | 1.0 | 14 |
| M-Fin 3-56-57-a | $7.148 \times 10^3$ | $8.982 \times 10^3$ | 3.04 | 12 |
| M-Fin 3-56-57-b | $3.154 \times 10^3$ | $4.129 \times 10^3$ | 3.04 | 10 |
| M-Dec 2-1 | $0.964 \times 10^3$ | $1.096 \times 10^3$ | 0.97 | 7.3 |
| M-Feb 3-2 | $1.08 \times 10^4$ | $2.05 \times 10^4$ | 3.92 | 4.4 |
| M-Dec 2-2 | $0.469 \times 10^3$ | $0.583 \times 10^3$ | 0.99 | 3.0 |

TABLE 2.—COUNTING DATA AND ENRICHMENT FACTORS SELECTED COBALT-60 ELECTROCHEMICAL ELUTION EXPERIMENTS

| Sample Identification | Counting Data (c.p.m.), Original ($C_0$) | Re-exposure ($C_1$) | $\frac{(nvt) \text{ (re-exp.)}}{(nvt) \text{ (original)}}$ | Enrichment Factor |
|---|---|---|---|---|
| V-Feb 3-11-1 | $1.10 \times 10^3$ | $1.46 \times 10^3$ | 6.5 | 20 |
| V-Feb 3-11-2 | $1.11 \times 10^3$ | $1.57 \times 10^3$ | 6.5 | 16 |
| V-Nov 2-7 | $7.46 \times 10^3$ | $11.7 \times 10^3$ | 1.0 | 1.7 |

TABLE 3.—EFFECT OF ELUENT CONCENTRATION

| Sample Identification | Effluent Number | Counting Data (c.p.m.) Original | Counting Data (c.p.m.) Re-exposure [1] | Percent Yield [2] | HCl Concentration | Enrichment Factor |
|---|---|---|---|---|---|---|
| V-5-1 | 1 | $5.10 \times 10^3$ | $8.89 \times 10^3$ | 2.98 | 0.00296 N | 6.50 |
|  | 2 | $3.13 \times 10^3$ | $5.53 \times 10^3$ | 1.82 |  | 6.27 |
|  | 3 | $1.51 \times 10^3$ | $2.71 \times 10^3$ | 0.88 |  | 6.03 |
| V-5-2 | 1 | $8.85 \times 10^3$ | $15.24 \times 10^3$ | 3.52 | 0.00592 N | 6.65 |
|  | 2 | $4.40 \times 10^3$ | $7.85 \times 10^3$ | 1.76 |  | 6.16 |
|  | 3 | $2.89 \times 10^3$ | $5.24 \times 10^3$ | 0.89 |  | 5.91 |
| V-5-3 | 1 | $7.71 \times 10^3$ | $13.35 \times 10^3$ | 3.76 | 0.0118 N | 6.58 |
|  | 2 | $2.89 \times 10^3$ | $5.24 \times 10^3$ | 1.41 |  | 5.95 |
|  | 3 | $1.67 \times 10^3$ | $3.10 \times 10^3$ | 0.82 |  | 5.65 |
| V-5-4 | 1 | $6.58 \times 10^3$ | $11.05 \times 10^3$ | 3.43 | 0.0178 N | 7.08 |
|  | 2 | $3.85 \times 10^3$ | $6.89 \times 10^3$ | 2.00 |  | 6.08 |
|  | 3 | $1.51 \times 10^3$ | $2.83 \times 10^3$ | 0.79 |  | 5.46 |
| V-5-5 | 1 | $10.55 \times 10^3$ | $18.17 \times 10^3$ | 4.07 | 0.0237 N | 6.66 |
|  | 2 | $5.79 \times 10^3$ | $10.29 \times 10^3$ | 2.24 |  | 6.17 |
|  | 3 | $1.71 \times 10^3$ | $3.11 \times 10^3$ | 0.66 |  | 5.90 |
| V-5-6 | 1 | $15.44 \times 10^3$ | $26.49 \times 10^3$ | 5.87 | 0.0296 N | 6.74 |
|  | 2 | $6.18 \times 10^3$ | $11.10 \times 10^3$ | 2.35 |  | 6.02 |
|  | 3 | $2.11 \times 10^3$ | $3.95 \times 10^3$ | 0.81 |  | 5.52 |

[1] $nvt$ (re-exp.)/$nvt$ (orignial) = 4.81.
[2] Percent of radionuclide formed.

TABLE 4.—EFFECT OF TIME ELAPSED BETWEEN IRRADIATION AND PROCESSING

| Sample Identification | Days Elapsed | Effluent Number | Counting Data (c.p.m.) Original | Counting Data (c.p.m.) Re-exposure [1] | Percent Yield [2] | Enrichment Factor |
|---|---|---|---|---|---|---|
| V-6-1 | 1 | 1 | $4.82 \times 10^3$ | $8.56 \times 10^3$ | 3.0 | 6.4 |
|  |  | 2 | $1.98 \times 10^3$ | $3.62 \times 10^3$ |  | 6.1 |
|  |  | 3 | $1.14 \times 10^3$ | $2.01 \times 10^3$ |  | 6.6 |
| V-6-2 | 2 | 1 | $5.97 \times 10^3$ | $10.47 \times 10^3$ | 3.0 | 6.6 |
|  |  | 2 | $2.07 \times 10^3$ | $3.79 \times 10^3$ |  | 6.0 |
|  |  | 3 | $1.15 \times 10^3$ | $2.04 \times 10^3$ |  | 6.4 |
| V-6-3 | 5 | 1 | $5.54 \times 10^3$ | $9.87 \times 10^3$ | 2.7 | 6.4 |
|  |  | 2 | $1.92 \times 10^3$ | $3.54 \times 10^3$ |  | 6.0 |
|  |  | 3 | $1.50 \times 10^3$ | $2.76 \times 10^3$ |  | 5.9 |
| V-6-4 | 9 | 1 | $1.15 \times 10^3$ | $2.09 \times 10^3$ | 1.1 | 4.6 |
|  |  | 2 | $0.95 \times 10^3$ | $1.00 \times 10^3$ |  | 5.6 |
|  |  | 3 | $3.18 \times 10^3$ | $5.40 \times 10^3$ |  | 7.1 |
| V-6-5 | 16 | 1 | $6.21 \times 10^3$ | $10.93 \times 10^3$ | 2.9 | 6.6 |
|  |  | 2 | $2.40 \times 10^3$ | $4.36 \times 10^3$ |  | 6.2 |
|  |  | 3 | $1.42 \times 10^3$ | $2.51 \times 10^3$ |  | 6.6 |

[1] $nvt$ (re-exp)/$nvt$(original) = 5.0.
[2] Percent of radionuclide formed.

TABLE 5.—EFFECT OF INTEGRATED NEUTRON FLUX [1]

| Sample Identification | Exposure Time (days) | Effluent Number | Counting Data (c.p.m.) | | $\dfrac{nvt \text{ (re-exp.)}}{nvt \text{ (original)}}$ | Enrichment Factor |
|---|---|---|---|---|---|---|
| | | | Original | Re-exposure | | |
| V-4-1 | 1 | 1 | 422 | 1,068 | 10 | 6.6 |
| | | 2 | 434 | 1,290 | 10 | 5.1 |
| V-4-2 | 2 | 1 | 1,148 | 1,795 | 5 | 7.9 |
| | | 2 | 1,017 | 1,606 | 5 | 8.6 |
| V-4-3 | 3 | 1 | 1,693 | 2,450 | 3.33 | 7.5 |
| | | 2 | 645 | 940 | 3.33 | 7.4 |
| V-4-4 | 4 | 1 | 2,077 | 2,645 | 2.5 | 10.1 |
| | | 2 | 1,270 | 1,660 | 2.5 | 8.5 |

[1] It is to be noted that enrichment factors actually appear to become higher with increasing integrated flux. This could be due to the diminishing relative importance of the residual exchangeable cobalt-59 ions remaining in the system as the amount of Co-60 increase.

TABLE 6.—COUNTING DATA AND ENRICHMENT FACTORS—BARIUM EXPERIMENTS

| Sample Identification Numbers [1] | Zero Time Counting Rates (c.p.m.) | | | | Ba Standards (mg.) | | Enrichment factor $\dfrac{ADE}{CBF}$ |
|---|---|---|---|---|---|---|---|
| | Eluted Ba-138 and Ba-139 (A) | Ba Standard Irradiated with clay (B) | Eluted Ba-139 after re-irradiation (C) | Ba Standard used in re-irradiation (D) | With original sample (E) | With eluted Ba-139 (F) | |
| M16-17 | $3.05 \times 10^4$ | $6.50 \times 10^5$ | $1.07 \times 10^4$ | $5.80 \times 10^5$ | 6.20 | 5.08 | 3.10 |
| M24-25 | $6.39 \times 10^3$ | $4.25 \times 10^5$ | $3.08 \times 10^3$ | $1.95 \times 10^5$ | 1.95 | 0.975 | 1.90 |
| M26-27 | $1.91 \times 10^4$ | $3.05 \times 10^5$ | $8.00 \times 10^3$ | $3.10 \times 10^5$ | 0.835 | 0.766 | 2.64 |
| M28-29 | $2.72 \times 10^4$ | $7.70 \times 10^5$ | $9.74 \times 10^3$ | $1.08 \times 10^6$ | 0.766 | 1.04 | 2.88 |
| M30-31 | $1.68 \times 10^4$ | $1.76 \times 10^6$ | $6.47 \times 10^3$ | $7.40 \times 10^5$ | 1.46 | 0.766 | 2.08 |

[1] Two numbers are used for each set of experiments. One is for the original sample, the other for the re-irradiated elution product.

It will be understood that various modifications and variations may be effected without departing from the spirit or scope of the novel concepts of my invention.

I claim as my invention:

1. The method of making radioisotopes which comprises the steps of: introducing cations to be made radioactive to an inorganic cation exchange material which is resistant to neutrons and other ionizing radiation and which is further characterized by the ability to fix such cations within its lattice structure; fixing said cations in said cation exchange material; removing not-fixed cations; irradiating said ion exchange material-fixed cation composite with neutrons to produce radioactive product nuclei of said cations and concurrently defixing such radioactive product nuclei; and separating such radioactive nuclei from the ion exchange mass.

2. The method of carrying out a nuclear reaction which comprises the steps of: introducing cations to be made radioactive to an inorganic cation exchange material which is resistant to neutrons and other ionizing radiation and which is further characterized by the ability to fix such cations within its lattice structure; fixing said cations in said cation exchange material; removing not-fixed cations; irradiating said ion exchange material-fixed cation composite with nuclear radiation to produce radioactive product nuclei of said cations and concurrently defixing such radioactive product nuclei, and separating such radioactive nuclei from the ion exchange mass.

3. The method of making radioisotopes which comprises the steps of: introducing cations to be made radioactive to an aluminum silicate clay ion exchanger material which is characterized by a closed lattice structure; fixing said cations in said exchanger; removing not-fixed cations; irradiating said exchanger-fixed cation composite with neutrons to produce a radioactive isotope of said cations and concurrently defining such cations and separating said cations from the exchanger mass.

4. The method of making cobalt$^{60}$ which comprises the steps of: introducing ions of cobalt$^{59}$ to an inorganic cation exchange material which is resistant to neutrons and other ionizing radiation and which is further characterized by the ability to fix such ions within its lattice structure; heating said cobalt$^{59}$ containing ion exchange material at approximately 700° C. for at least 24 hours to fix said ions in said cation exchange material; removing not-fixed barium; irradiating said ion exchange material-cobalt$^{59}$ composite with neutrons to produce cobalt$^{60}$ and concurrently defixing such cobalt$^{60}$, and separating such cobalt$^{60}$ from the ion exchange mass.

5. The method as defined by claim 4 wherein said inorganic cation exchange material is an aluminum silicate clay.

6. The method of making barium$^{139}$ which comprises the steps of: introducing ions of barium$^{138}$ to an inorganic cation exchange material which is resistant to neutrons and other ionizing radiation and which is further characterized by the ability to fix such ions within its lattice structure; heating barium$^{138}$ containing ion exchange material at approximately 700° C. for at least 24 hours to fix said ions in said cation exchange material; removing not-fixed cobalt ions; irradiating said ion exchange material-cobalt$^{59}$ composite with neutrons to produce cobalt$^{60}$ and concurrently defixing such cobalt$^{60}$, and separating such cobalt$^{60}$ from the ion exchange mass.

7. The method as defined by claim 6 wherein said inorganic cation exchange material is an aluminum silicate clay.

8. The method of making cobalt$^{60}$ which comprises the steps of: introducing ions of cobalt$^{59}$ to an inorganic cation exchange material which is resistant to neutrons and other ionizing radiation and which is further characterized by the ability to fix such ions within its lattice structure; fixing said cobalt$^{59}$ ions in said cation exchange material; removing not-fixed cobalt; irradiating said ion exchange material-cobalt$^{59}$ composite with neutrons to produce cobalt$^{60}$ and concurrently defix such cobalt$^{60}$, and separating such cobalt$^{60}$ from the ion exchange mass.

9. The method of making barium$^{139}$ which comprises the steps of: introducing ions of barium$^{138}$ to an inorganic cation exchange material which is resistant to neutrons and other ionizing radiation and which is further characterized by the ability to fix such ions within its lattice structure; fixing said barium$^{138}$ on said cation exchange material; removing not-fixed barium; irradiating said ion exchange material-barium$^{138}$ composite with neutrons to produce barium$^{139}$ and concurrently defix such barium$^{139}$, and separating such barium$^{139}$ from the ion exchange mass.

References Cited by the Examiner

UNITED STATES PATENTS

| | | | |
|---|---|---|---|
| 1,592,543 | 7/26 | Stewart | 252—455 |
| 1,617,476 | 2/27 | Christopher | 252—455 |
| 2,780,517 | 2/57 | Fontana | 176—16 |
| 2,887,357 | 5/59 | Seaborg et al. | 176—16 |

CARL D. QUARFORTH, *Primary Examiner.*

L. DEWAYNE RUTLEDGE, *Examiner.*

UNITED STATES PATENT OFFICE
CERTIFICATE OF CORRECTION

Patent No. 3,167,479

January 26, 1965

Paul Y. Feng

It is hereby certified that error appears in the above numbered patent requiring correction and that the said Letters Patent should read as corrected below.

Column 8, line 41, for "barium" read -- cobalt --; line 56, for "cobalt" read -- barium --; line 57, for "cobalt$^{59}$" read -- barium$^{138}$ --; same line 57 and lines 58 and 59, for "cobalt$^{60}$", each occurrence, read -- barium$^{139}$ --.

Signed and sealed this 25th day of February 1969.

(SEAL)
Attest:

Edward M. Fletcher, Jr.
Attesting Officer

EDWARD J. BRENNER
Commissioner of Patents